(12) United States Patent
Robinet et al.

(10) Patent No.: US 9,092,982 B2
(45) Date of Patent: Jul. 28, 2015

(54) DEVICE FOR MEASURING THE SPEED OF DISPLACEMENT OF AN OBJECT DEFORMING THE LINES OF THE TERRESTRIAL MAGNETIC FIELD

(75) Inventors: Antoine Robinet, Tullins (FR); Roland Blanpain, Entre-Deux-Guiers (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 387 days.

(21) Appl. No.: 13/521,096

(22) PCT Filed: Jan. 7, 2011

(86) PCT No.: PCT/EP2011/050185
§ 371 (c)(1),
(2), (4) Date: Nov. 19, 2012

(87) PCT Pub. No.: WO2011/083149
PCT Pub. Date: Jul. 14, 2011

(65) Prior Publication Data
US 2013/0057264 A1   Mar. 7, 2013

(30) Foreign Application Priority Data
Jan. 8, 2010   (FR) ..................... 10 00063

(51) Int. Cl.
*G08G 1/052*   (2006.01)
*G08G 1/042*   (2006.01)
(Continued)

(52) U.S. Cl.
CPC  *G08G 1/052* (2013.01); *G01P 3/42* (2013.01); *G01P 3/66* (2013.01); *G08G 1/042* (2013.01)

(58) Field of Classification Search
CPC ............. B61L 1/00; G05D 1/03; G09F 13/02; G09F 15/00; G08G 1/01; G08G 1/095; G08G 1/042; G08G 1/052–1/054; G01R 27/00; G01R 25/00; G06F 19/00; G01S 7/42; G01S 7/36; G01P 3/66–3/665; G01P 3/42–3/44
USPC .............. 324/323, 345, 365, 72, 207.13, 247, 324/302; 702/150, 152, 5
See application file for complete search history.

(56) References Cited
U.S. PATENT DOCUMENTS 3,860,869 A   1/1975 Parks
5,199,814 A * 4/1993 Clark et al. ..................... 404/10
(Continued)

FOREIGN PATENT DOCUMENTS

DE          1020658       12/1957
DE     EP0357893 A2 *    6/1989
(Continued)

OTHER PUBLICATIONS
"Detection and localization in real-time of a ferromagnetic moving object", Y. Caritu, B. Flament, F. Vacherand, R. Blanpain, fifteenth GRETSI conference at Juan les Pins, from Sep. 18 to 21, 1995.

*Primary Examiner* — Jermele M Hollington
*Assistant Examiner* — James Split
(74) *Attorney, Agent, or Firm* — Occhiuti & Rohlicek LLP

(57) ABSTRACT

An apparatus for measuring speed of movement of an object deforming lines of Earth's magnetic field includes a first and second magnetometer disposed on either side of a traffic roadway for the object and substantially perpendicular to the object. The magnetometers are configured for measuring deformation of Earth's magnetic field by the object travelling over the roadway. The apparatus also includes a processing unit configured for extracting, from each of the magnetometers, a measurement value corresponding to a quotient defined by a distance of the object with respect to the magnetometer divided by a speed of movement of the object, and for calculating a speed of the object from the measurement values and a geometrical disposition of the magnetometers with respect to one another and with respect to the traffic roadway.

13 Claims, 1 Drawing Sheet

(51) Int. Cl.
   *G01P 3/42* (2006.01)
   *G01P 3/66* (2006.01)

(56) References Cited

U.S. PATENT DOCUMENTS

| | | | | |
|---|---|---|---|---|
| 5,331,276 | A | * | 7/1994 | Polvani et al. ................ 324/160 |
| 5,347,456 | A | * | 9/1994 | Zhang et al. .................... 701/23 |
| 5,880,682 | A | * | 3/1999 | Soulliard et al. ............. 340/907 |
| 5,954,299 | A | | 9/1999 | Pace |
| 6,137,424 | A | * | 10/2000 | Cohen et al. ................. 340/933 |
| 6,151,821 | A | * | 11/2000 | Nakajima ....................... 40/612 |
| 6,201,493 | B1 | * | 3/2001 | Silverman ...................... 342/20 |
| 6,208,268 | B1 | * | 3/2001 | Scarzello et al. ............. 340/941 |
| 6,519,884 | B1 | * | 2/2003 | Duhamel ........................ 40/612 |
| 6,828,920 | B2 | * | 12/2004 | Owen et al. ................... 340/941 |
| 7,474,233 | B2 | * | 1/2009 | Ponert .......................... 340/941 |
| 7,579,828 | B2 | * | 8/2009 | Laforest et al. .......... 324/207.11 |
| 2003/0163263 | A1 | * | 8/2003 | Bertrand et al. ................ 702/65 |
| 2004/0252193 | A1 | * | 12/2004 | Higgins ........................ 348/149 |
| 2008/0169385 | A1 | * | 7/2008 | Ashraf et al. ................. 246/130 |

FOREIGN PATENT DOCUMENTS

| | | |
|---|---|---|
| DE | 202008000437 U1 | 6/2006 |
| EP | 0629861 | 12/1994 |
| FR | 2768230 | 9/1997 |

* cited by examiner

DEVICE FOR MEASURING THE SPEED OF DISPLACEMENT OF AN OBJECT DEFORMING THE LINES OF THE TERRESTRIAL MAGNETIC FIELD

CROSS-REFERENCE TO RELATED APPLICATIONS

This application is the National Stage of International Application No. PCT/EP2011/050185, filed on Jan. 7, 2011, which claims the benefit of the priority date of French application Ser. No. 10/00063, filed on Jan. 8, 2010. The content of these applications is hereby incorporated by reference in its entirety.

TECHNICAL FIELD

The invention relates to a device for measuring the speed of movement of an object deforming the lines of the Earth's magnetic field.

BACKGROUND ART

The measurement of the speed of vehicles is an on-going issue for ensuring road safety. Thus, studies have demonstrated that the number of road accidents is directly correlated with the average speed of the vehicles.

At the present time, several devices exist for measuring the speed of automobile vehicles:

For example, fixed or mobile radar devices are noted. These installations which allow a precise measurement of the speed to be made are very costly and complex.

Laser sighting devices use the Doppler effect for the speed measurement and also allow a precise measurement of the speed of vehicles. However, an operator has to aim at the vehicle and the driver at fault has to be apprehended shortly following his infraction.

Furthermore, inductive loops installed under the roadway also exist. However, the precision of the measurement is not optimum and the cost of installation of an inductive loop into the roadway is a significant intervention and very costly. Furthermore, these loops integrated into the roadway are subjected to large stresses, in particular by heavy trucks, reducing their lifetimes.

The documents EP 0 629 861, U.S. Pat. No. 6,208,268 and U.S. Pat. No. 5,954,299 describe devices for measuring the speed of terrestrial vehicles, comprising two sensors disposed one behind the other at a predetermined distance along the road at the side of the latter and comprising a measurement unit connected to the sensors which determines the phase-shift or the time-shift of the electrical output signals from the sensors and calculates, from these, with the distance of the sensors, the speed of the vehicles.

The sensors are magnetometers which detect the deformation of the Earth's magnetic field by the vehicle (ferromagnetic overall).

Although the price of these sensors is affordable, these installations suffer from a lack of precision, such that their use, notably in urban areas requiring a more precise speed measurement, is not appropriate.

The document 102 0 658 describes an analogous installation with an overhead gantry on which are installed for each lane two magnetometers, one behind the other in the direction of flow of the vehicles.

The document U.S. Pat. No. 3,860,869 describes a device for measuring the speed of a terrestrial vehicle with a single magnetometer which detects the speed along a rectilinear path.

However, this solution described with military vehicles is not adapted to a situation for monitoring traffic where the vehicles can closely follow one another.

SUMMARY

The objective of the invention is therefore a device for measuring the speed of movement of a ferromagnetic object deforming the lines of the Earth's magnetic field.

For this purpose, the subject invention is a device for measuring the speed of movement of an object deforming the lines of the Earth's magnetic field, such as an automobile vehicle, characterized in that it comprises a first and second magnetometer disposed on either side of a traffic roadway for said object and substantially perpendicular to the latter, the magnetometers being configured for measuring the deformation of the Earth's magnetic field of said object moving over said roadway, and a processing unit configured for extracting for each magnetometer a measurement value corresponding to the quotient of the distance of the object with respect to the magnetometer divided by the speed of movement of the object, and for calculating the speed of the object from these measurement values and the geometrical disposition of the magnetometers with respect to one another and with respect to the traffic roadway.

The measurement device of the speed can furthermore comprise one or more of the following features, taken separately or in combination:

the magnetometers are single-axis, dual-axis, triple-axis, scalar or gradient fluxgate magnetometers, the magnetometers are installed high up with respect to the traffic roadway, the magnetometers are installed at a height in the range between 1.5 m and 3 m.

each magnetometer is carried by a road sign, the processing unit is furthermore configured for determining the distance between two objects following one another from the speed of movement of the second object and the time between the passages of the two objects between the magnetometers, the processing unit comprises a comparator of the calculated speed with a setpoint speed which transmits an alarm signal in the case of excess speed, the processing unit comprises a module for identification of the moving object by its magnetic signature according to a stored set of signatures and corresponding objects and the setpoint speed is adapted according to the object detected, the processing unit comprises a comparator of the inter-distance calculated between two objects with a setpoint inter-distance which transmits an alarm signal if the inter-distance is less than or equal to the setpoint inter-distance.

The invention also relates to an installation for measuring the speed of an automobile vehicle, characterized in that it comprises a measurement device such as defined hereinabove, an electrical power supply unit and a unit for radiofrequency transmission of the measurement results. The invention further relates to a road sign designed to be used for an installation such as defined hereinabove, characterized in that it carries a magnetometer.

According to one aspect, the road sign is made from a non-magnetic material.

According to another aspect, the road sign comprises a non-magnetic support for the magnetometer, fixed to the metal structure of the road sign at a predefined distance.

BRIEF DESCRIPTION OF THE DRAWINGS

Other features and advantages of the invention will become apparent from the following description, presented by way of non-limiting example, with regard to the appended drawings amongst which.

DETAILED DESCRIPTION

In these figures, identical elements carry the same references.

Figure 1:
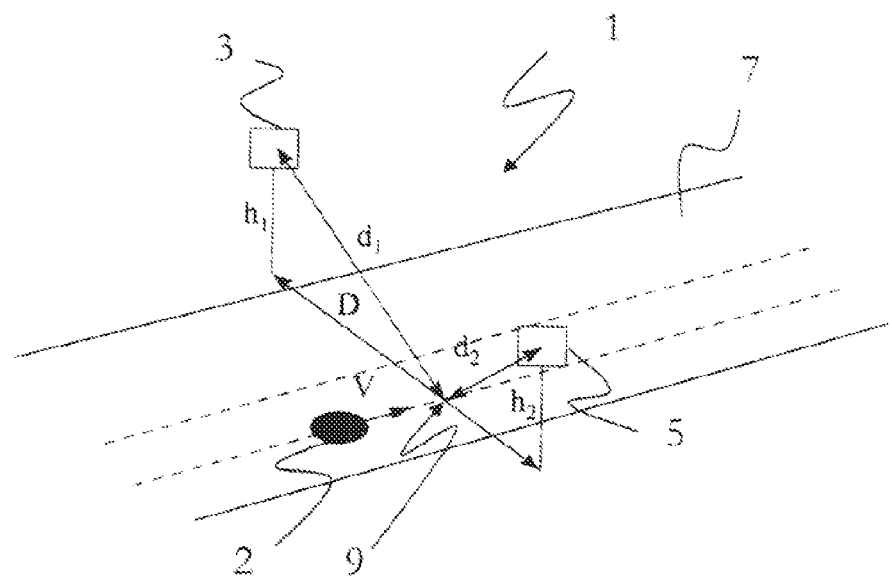
FIG. 1 shows a simplified diagram in perspective of a device according to the invention

FIG. 1 illustrates a device 1 for measuring the speed of movement of an object 2 deforming the lines of the Earth's magnetic field, such as a ferromagnetic object such as an automobile vehicle. It could also be an object that is non-ferromagnetic, but carrying a magnet, an electromagnet or an AC magnetic field generator.

Automobile vehicle is understood to include, together with cars or trucks, both trains or aircraft, moving for example at an airport over a taxiway or runway.

This device comprises at least a first 3 and second 5 magnetometer disposed on either side of a traffic roadway 7 for said object and substantially perpendicular to the latter.

By design, the magnetometers 3 and 5 are configured for measuring the deformation of the Earth's magnetic field upon passage of said object moving over said roadway, in other words upon passage of a vehicle.

The traffic roadway 7 is, in the present case, a one-way road with two lanes or a two-way road, but a freeway with 4 lanes where the magnetometers are disposed, on the one hand, on the roadside and, on the other, on the central divider of the freeway may of course also be envisioned.

By means of magnetic shielding, the magnetometers are furthermore also designed to target for the measurement a measurement line coincident with the arrow 9 indicating the distance D which is the distance between the two magnetometers projected onto the ground.

It is observed that this target line is substantially perpendicular with respect to the roadway 7.

This device is capable of measuring the normal component V of the speed, in other words the component of the speed perpendicular to the target line 9 and in both directions.

Single-axis, dual-axis, triple-axis, scalar or gradient fluxgate magnetometers may be used, the latter being advantageous for noise rejection on the measurement results.

As can be seen schematically in FIG. 1, the magnetometers are installed high up ($h_1$ for the magnetometer 3 and $h_2$ for the magnetometer 5) with respect to the traffic roadway 7, for example at a height in the range between 1.5 m and 3 m.

One good solution is to mount each magnetometer 3, 5 on a road sign, such as for example a 30 mph speed limit road sign. This is advantageous since, in most cases, there are two road signs at the same height over a road.

Indeed, for a freeway, the speed limit must be indicated on either side of the dual lanes; for a two-way road, one road sign indicates the entry into the speed limit zone and the other road sign indicates the exit from the speed limit zone.

The road sign can be composed, at least partially for the part supporting the magnetometer, of a non-magnetic material or, alternatively, it may be a road sign with a metal structure and comprising a non-magnetic support for the magnetometer, fixed to the metal structure of the road sign at a predefined distance.

Figure 2:
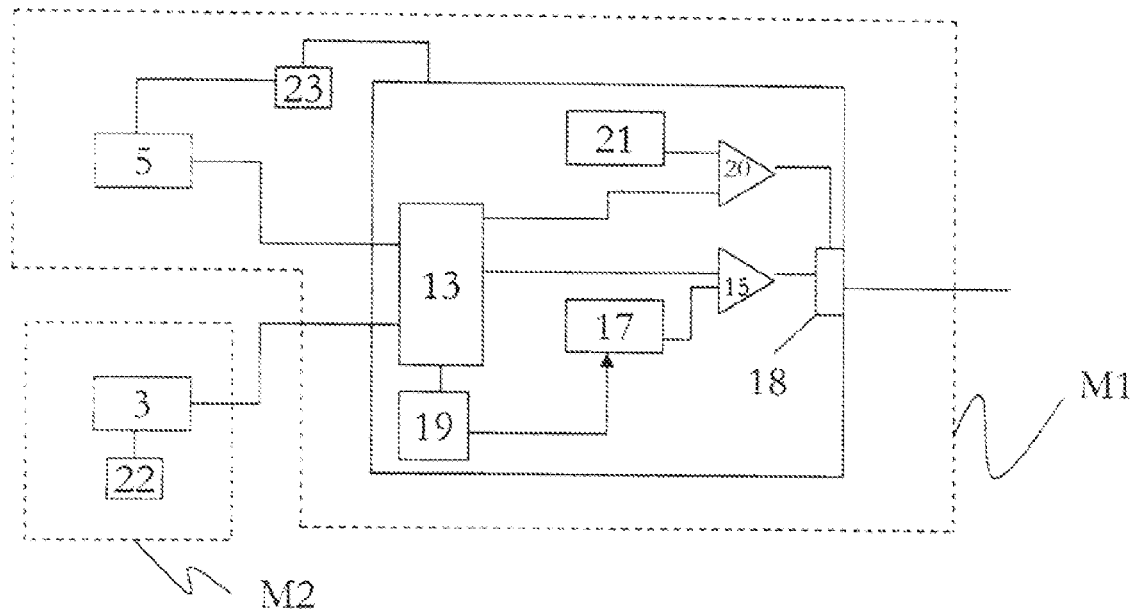
FIG. 2 shows a schematic circuit diagram of the installation according to the invention with the measuring device according to the invention.

The magnetometers 3 and 5 are connected to a processing unit 11 (see FIG. 2).

The latter is configured for extracting for each magnetometer 3, 5, in a module 13, a measurement value corresponding to the quotient of the distance of the object with respect to the magnetometer divided by the speed of movement of the object, in other words a value $d_1/V$ for the magnetometer 3 and $d_2/V$ for the magnetometer 5. $d_1$ and $d_2$ are respectively the minimum distances (also known as "cpa" for "closest point approach") of the object 2 with respect to the magnetometers 3 and 5 when passing between the magnetometers.

This is carried out by measuring the magnetic signature of the moving object, in other words the variation of the interference signal over time and applying to it via projection of dipolar signals onto an orthonormal base.

Indeed, each magnetometer measures the Earth's magnetic field modified by the movement of the object 2. In response, it generates three electrical signals respectively proportional to the x, y and z components of the magnetic field measured along the directions X, Y and Z.

In the given configuration, the processing of the signals can be simplified given that, at least to a first approximation, the movement is uniform and rectilinear. Accordingly, this also assumes that the speed is unknown but to a first approximation constant.

In this case, the object 2 always presents the same orientation to the Earth's field and its induced moment is constant.

The result of this is that the total moment, which is the sum of the permanent moment and the induced moment, is invariant to a first approximation when passing between the magnetometers 3 and 5.

In order to obtain the values $d_1/V$ for the magnetometer 3 and $d_2/V$ for the magnetometer 5, reference is made to an adaptive filtering based on Anderson functions which is for example described in the following documents, included for reference:

R. Blanpain, "Real-time processing of the signal from a magnetometric probe for the detection of magnetic anomalies", I.N.P.G. thesis, October 1979.

"Detection and localization in real-time of a ferromagnetic moving object", Y. CARITU, B. FLAMENT, F. VACHERAND, R. BLANPAIN, fifteenth GRETSI conference at Juan les Pins, from 18 to 21 Sep. 1995

"Comparison of classification methods: application to the identification of underwater ferromagnetic objects", A. QUINQUIS and E. RADOI, Revue Traitement du signal 1998—Volume 15, No 3.

Indeed, in the case of a uniform rectilinear motion, the measured signal S (t) may be decomposed based on three orthonormal rational functions $e_i(t)(i=0, 1, 2)$ known as Anderson functions:

$$S_j(t) = \sum_{i=0}^{t=2} s_{ji} e_j\left(\frac{t}{D_i/V}\right)$$

where $s_{ij}$ are normalization constants.

In this configuration, t=0 corresponds to the time when the object 2 is nearest to the measurement magnetometer 3 or 5 (also known as "cpa" for "closest point approach").

The projection of the sequence $S_j(t)$ onto one of the functions $e_j(t)$ is for example carried out by calculating the correlation coefficient $s_{ij}$ between the sequence $S_j(t)$ and the function $e_i(t)$. This calculation is detailed in the documents cited hereinabove.

More precisely, each function $e_j(t)$ depends not only on the time t but also on the ratio V/D. First of all, a set of j values for the ratio $V/D_j$ is constructed. The function $e_i(t)$ obtained for a particular value of the ratio $V/D_j$ is denoted $e_{ij}(t)$, where i is the index of the Anderson function (i=0, 1 or 2) and j is the index of a particular value of the ratio $V/D_j$ chosen within the set of values previously constructed. The functions $e_{ij}(t)$ are pre-recorded.

The sequence S(t) is projected onto each of the stored functions $e_{ij}(t)$. j correlation coefficients $s_{ij}$ between this sequence S(t) and the corresponding function $e_{ij}(t)$ are thus obtained.

For each index j, an energy $E_j(t)$ is calculated by means of the following equation:

$$E_j(t)=(s_{0j})^2+(s_{1j})^2+(s_{2j})^2$$

Then, a value m of the index j is selected which maximizes the energy $E_j(t)$. This value m corresponds to a set of coefficients $s_{im}$.

By determining the maximum correlation in an iterative manner, the values $d_1/V$ for the magnetometer 3 and $d_2/V$ for the magnetometer 5 can be respectively obtained.

During the installation of the device 1, the heights $h_1$, $h_2$ and also the distance D are measured with precision.

For the calculation of the speed of the object 2 by the module 13 from these measurement values and the geometrical disposition of the magnetometers with respect to one another and with respect to the traffic roadway, the following equation is additionally used:

$$\sqrt{(d_3^2-h_3^2)}+\sqrt{(d_2^2-h_2^2)}=D$$

where $d_3$ and $d_2$ are respectively the distances of the object 2 with respect to the magnetometers 3 and 5.

A system of three equations with three unknown variables is thus obtained that may be solved digitally in order to obtain the speed of movement V of the object, in other words of the automobile vehicle.

The processing unit 11, in particular the module 13, is furthermore configured for determining the distance between two objects (vehicles) following one another from the speed of movement of the second object and the time between the passages of the two objects between the magnetometers.

Subsequently, the processing unit 11 can comprise a comparator 15 of the calculated speed with a setpoint speed stored in a memory 17, and which transmits an alarm signal, for example by a unit 18 for radiofrequency transmission of the measurement results, in the case of the speed being exceeded.

This alarm can be a simple warning light signal a few tens of meters further on or a display of the speed of the vehicle.

Coupled with a station for identification by camera, the information on the identity of the vehicle and the amount by which the permitted speed limit is exceeded can be transmitted to a local authority security center.

In one improved version, the processing unit 11 comprises a module 19 for identification of the moving object by its magnetic signature according to a stored set of signatures and corresponding objects and the setpoint speed in the memory 17 is adapted according to the object detected.

Selective speed limits can therefore be taken into account, for example for trucks or buses of a certain weight, on the one hand, and cars on the other, for example in the entry onto the freeway.

The processing unit can also comprise a comparator of the inter-distance 20 calculated between two objects with a setpoint inter-distance stored in the memory 21, and which transmits an alarm signal if the inter-distance is less than or equal to the setpoint inter-distance.

Finally, each magnetometer can be provided with its own source of electrical power supply 22 and 23, respectively, for example accumulators or batteries, solar panels or other sources of renewable energy.

According to one aspect, the processing unit 11, the power supply 23 and the magnetometer 5 form for example a first module M1 and are installed on the same road sign on one side of the road. This assembly acts as a "master sensor", whereas the magnetometer 3 with its power supply 22 on the other side of the road can form a module M2 connected by radio or by wired link to the unit 11 and act as a "slave sensor".

It will therefore be understood that the device according to the invention enables a low-cost and reliable speed measurement that is independent of the climatic conditions.

The invention is a robust device which is not subjected to wear by the passing vehicles, and which only requires very little specific road planning, given that it can for example rely on existing road signs. Nor is it necessary to install specific supporting structures.

The invention claimed is:

1. An apparatus for measuring speed of movement of an object deforming lines of Earth's magnetic field when moving over a traffic roadway, said apparatus comprising a first magnetometer and second magnetometer, said first magnetometer being disposed on a first side of said traffic roadway and designed to target for a first measurement a measurement line perpendicular with respect to said roadway, said second magnetometer being disposed on said second side of a traffic roadway, opposite to said first side, and designed to target for a second measurement said measurement line perpendicular with respect to said roadway, said first and second magnetometers being configured for measuring deformation of Earth's magnetic field by said object travelling over said roadway, and a processing unit configured for extracting, from said first magnetometer, a first measurement value corresponding to a quotient of the minimum distance of said object with respect to said first magnetometer divided by a speed of movement of said object, and for extracting from said second magnetometer a second measurement value corresponding to the quotient of the minimum distance of the object with respect to said second magnetometer divided by said speed of movement of the object, and for calculating said speed of said object from said first and second measurement values and a geometrical disposition of said magnetometers with respect to one another and with respect to said traffic roadway.

2. The apparatus of claim 1, wherein said magnetometers are selected from a group consisting of single-axis magnetometers, dual-axis, triple-axis magnetometers, scalar magnetometers and gradient fluxgate magnetometers.

3. The apparatus of claim 1, wherein said magnetometers are installed high up with respect to said traffic roadway.

4. The apparatus of claim 3, wherein said magnetometers are installed at a height in the range between 1.5 m and 3 m above said traffic roadway.

5. The apparatus of claim 3, wherein each magnetometer is carried by a road sign.

6. The apparatus of claim 1, wherein said processing unit is further configured for determining a distance between two objects following one another from a speed of movement of said second object and a time interval separating passages of said two objects between said magnetometers.

7. The apparatus of claim 1, wherein said processing unit comprises a comparator for comparing a calculated speed with a setpoint speed, and wherein said processing unit is configured to transmit an alarm signal in response to detecting a calculated speed in excess of said setpoint speed.

8. The apparatus of claim 7, wherein said processing unit comprises a module for identification of said moving object based at least in part on a magnetic signature thereof and a stored set of magnetic signatures and corresponding objects, and wherein said setpoint speed is adapted to correspond to said object identified.

9. The apparatus of claim 5, wherein said processing unit comprises a comparator for comparing a calculated separation distance between two objects with a setpoint inter-distance, and wherein said processing unit is configured to transmit an alarm signal if said calculated separation distance is less than or equal to said setpoint inter-distance.

10. The apparatus of claim 1, further comprising an electrical power supply unit and a transmission unit for radiofrequency transmission of an alarm signal based on said speed of said object, wherein said apparatus, said power supply unit, and said transmission unit define an installation for measurement of speed of an automobile.

11. A road sign configured to be used for said installation recited in claim 10, wherein said road sign carries said first magnetometer.

12. The road sign of claim 11, wherein said sign is made from a non-magnetic material.

13. The road sign of claim 11, further comprising a non-magnetic support for said first magnetometer, said first magnetometer being fixed to a metal structure of said road sign at a predefined distance.

* * * * *